United States Patent [19]

Jones et al.

[11] Patent Number: 5,333,689
[45] Date of Patent: Aug. 2, 1994

[54] GRAVEL PACKING OF WELLS WITH FLUID-LOSS CONTROL

[75] Inventors: Lloyd G. Jones, Dallas; Tommy J. Yates, Coppell, both of Tex.

[73] Assignee: Mobil Oil Corporation, Fairfax, Va.

[21] Appl. No.: 23,454

[22] Filed: Feb. 26, 1993

[51] Int. Cl.$^5$ .............................................. E21B 43/04
[52] U.S. Cl. ...................................... 166/278; 166/300
[58] Field of Search ......................... 166/276, 278, 300

[56] References Cited

U.S. PATENT DOCUMENTS

| | | | |
|---|---|---|---|
| 2,193,775 | 3/1940 | Stratford | 166/278 |
| 2,814,347 | 11/1957 | MacKnight | 166/278 |
| 3,675,717 | 7/1972 | Goins, Jr. et al. | 166/278 |
| 4,621,692 | 11/1986 | Monoshine | 166/278 X |
| 4,664,191 | 5/1987 | Jennings, Jr. | 166/276 |
| 5,072,791 | 12/1991 | Whitebay | 166/278 |
| 5,191,931 | 3/1993 | Himes et al. | 166/300 X |
| 5,222,558 | 6/1993 | Montgomery et al. | 166/278 |
| 5,269,375 | 12/1993 | Schroeder, Jr. | 166/278 |

*Primary Examiner*—George A. Suchfield
*Attorney, Agent, or Firm*—Alexander J. McKillop; George W. Hager, Jr.

[57] ABSTRACT

A method of completing a well which includes the installion of a gravel pack completion adjacent a formation in the well. A fluid-loss agent is flowed into the well to form a barrier to flow into and/out of the formation prior to the installation of the gravel pack. A screen is then lowered into the well and is positioned adjacent the formation. A gravel slurry which includes a removal agent is flowed into the well to deposit gravel. The removal agent contacts and dissolves or disintegrates the flow barrier to thereby open flow to the formation during the placement of the gravel.

12 Claims, No Drawings

GRAVEL PACKING OF WELLS WITH FLUID-LOSS CONTROL

DESCRIPTION

1. Technical Field

The present invention relates to the gravel packing of wells and in one of its aspects relates to a method for installing a gravel pack completion while controlling the fluid-losses in a well.

2. Background

In producing hydrocarbons or the like from loosely or unconsolidated and/or fractured subterranean formations, it is not uncommon for large volumes of particulate material (e.g. sand) to flow the formations along with the produced fluids. As is well known in the art, these particulates routinely cause a variety of problems and must be controlled in order for production to be economical. Probably the most popular technique used for controlling the production of particulates (e.g. sand) from a well is one which is commonly known as "gravel packing".

In a typical gravel pack completion, a screen is lowered into the wellbore on a workstring and is positioned adjacent the subterranean formation is to be completed, e.g. a producing formation. Particulate material, collectively referred to as gravel, and a carrier liquid is then pumped as a slurry down the workstring where it exits through a "cross-over" or the like above the screen and flows downward between the screen and the well casing or open hole, as the case may be. The carrier liquid in the slurry normally flows into the formation and/or the openings in the screen which, in turn, are sized to prevent the flow of gravel therethrough. This results in the gravel being deposited or "screened out" in the annulus around the screen where it collects to form the gravel pack. The gravel, in turn, is sized so that it forms a permeable mass which allows flow of the produced fluids therethrough and into the screen while blocking the flow of any particulates produced with the formation fluids.

One problem which exists in gravel packing a well arises from the use of typical "well completion fluids" in the well while installing a gravel pack therein. For example, the "drilling mud", which is used in drilling a well may be replaced with a high-density, well-completion fluid, e.g. "heavy brine" in order to control high pressure zones in the well while the well is cased and perforated. Further, the completion fluids do not form a "filter cake" as do most drilling muds which could block the perforations once they were formed in the well casing and which would be extremely difficult to remove once the gravel pack was in place.

While high-density, well-completion fluids (e.g. zinc bromide brines) are routinely used in most wells, they are very expensive and must be substantially recovered after they have served their purpose in order for such fluids to be used economically. Unfortunately, however, due to the density or "weight" of these completion fluids, there is always a real danger that substantial volumes, if not all, of these fluids may be "lost" into a formation within the wellbore during the completion of a well. That is, the pressure due to the head of completion fluid in the wellbore, being greater than the pressure in the formation, may cause the completion fluid to flow from the wellbore into the formation where it becomes "lost" and can not be recovered.

To prevent the loss of the expensive completion fluids into a formation, it is common in the well completion art to use "fluid-loss" agents in conjunction with the completion fluid. As a "fluid-loss" agent, e.g. benzoic acid flakes, flows through the casing perforations into a formation, the agent forms a barrier which blocks further flow of fluid, i.e. the expensive completion fluid, therethrough. However, since the formation must eventually be produced back through the same perforations, the barriers formed by the fluid-loss agent obviously have to be removed from the perforations after the well has been gravel packed and is ready to be put on production.

In known prior well completions, when a gravel pack is installed in a well wherein the perforations are blocked by a fluid-loss agent, the perforations will remain blocked while the the gravel is being placed. Accordingly, the carrier fluid from the gravel slurry can only flow through the the openings in the screen. Since the slurry can not flow through the blocked perforations, no gravel will be deposited in the perforations themselves, thereby producing a less than desired gravel pack.

Once the gravel is in place, a removal agent such as gelled diesel is then pumped down the wellbore and into the gravel pack to contact and react with the fluid-loss in the perforations to reopen the perforations to flow. Unfortunately, it is believed that the removal agent will contact and remove the fluid-loss barrier in the uppermost perforations before it has had a chance to reach the all of the perforations in the casing. Once the flow barriers are removed from the upper perforations, the removal agent will merely take the path of least resistance and flow into the formation through the open, upper perforations. Accordingly, the lower perforations may remain blocked during production.

SUMMARY OF THE INVENTION

The present invention provides a method of completing a well which includes the installation of a gravel pack completion adjacent a formation in the well. A fluid-loss agent is flowed into the well to form a barrier to flow into and/out of the formation prior to the installation of the gravel pack. A screen is then lowered into the well and is positioned adjacent the formation. A gravel slurry is flowed into the well to deposit gravel around the screen in basically the same way as gravel is deposited in most prior art gravel pack operations.

However, in accordance with the present invention, a removal agent is incorporated into the gravel slurry which is capable of dissolving or disintegrating the flow barrier upon contact to open flow into the formation during the placement of the gravel.

More specifically, the present invention provides a method of completing a well wherein a fluid-loss agent, e.g. (e.g. benzoic acid flakes, cross-linked hydroxyethyl cellulose (HEC); powdered calcium carbonate, etc.) is used in conjunction with an expensive well-completion fluid (e.g. zinc bromide brines) to prevent the well-completion fluid from being lost into a formation. The fluid-loss agent forms a barrier as it flows through casing perforations or the like thereby blocking further flow therethrough. If these perforations are left blocked during the placement of a gravel pack as they normally are during prior art gravel packing operations, they can not be "packed" with gravel which adversely affects the efficiency of the gravel pack. Further, it is difficult, if possible at all, to remove the fluid-loss agent from all of the perforations after the gravel is in place.

In accordance with the present invention, after a fluid-loss agent has been flowed into the well and flow through the perforations in the well casing is blocked, a gravel pack screen is lowered into the wellbore and is positioned adjacent the formation to be completed, A gravel slurry is then flowed down the well to deposit gravel around the screen thereby forming the desired gravel pack. The gravel slurry includes a removal agent which forms or is incorporated into a carrier fluid which, in turn, is mixed with the gravel to form the gravel slurry.

The "removal agent" is a material which reacts with the fluid-loss agent to dissolve or disintegrate the flow barriers in the perforations. By incorporating the removal agent directly into the gravel slurry, the gravel in the slurry acts as an excellent diverter to direct the removal agent into contact with the fluid-loss agent in all of the perforations to thereby open substantially all of the perforations to flow. Once the perforations are open, the gravel slurry can now flow therethrough and deposit gravel therein, thereby "packing" the perforations and greatly improving the efficiency of the gravel pack.

BEST KNOWN MODE FOR CARRYING OUT THE INVENTION

In completing a well, it is often necessary to use a high-density, well-completion fluid to "balance" or otherwise control high-pressure zones in the well. In order to be able to use such expensive fluids, e.g. zinc bromide brines, the fluid, itself, must be recoverable for reuse. Unfortunately, however, the pressure in the wellbore due to the head of the completion fluid may be substantially greater than the formation pressure which may result in the fluid flowing from the wellbore into the formation where substantial volumes are "lost" to the formations.

To prevent this from occurring, it is common and well known in the art to use "fluid loss" agents in conjunction with such expensive well-completion fluids to block flow into the formation and thereby prevent the loss of the well-completion fluid. Such agents are well known (e.g. benzoic acid flakes, cross-linked hydroxyethyl cellulose (HEC); powdered calcium carbonate, etc. ) and all are commercially-available for this purpose. As will be understood in the art, the fluid-loss agent forms a barrier as it flows through casing perforations or the like which then blocks flow of the expensive well-completion fluid therethrough, thereby preventing the loss of this fluid into the formation.

Using a fluid-loss agent in completing a well does, however, creates certain disadvantages when a gravel pack is to be installed in the well. That is, in installing a typical gravel pack completion in a well in which a fluid-loss agent has been used in conjunction with a well completion fluid, it is common to leave many of the perforations blocked until after the gravel pack is in place. Accordingly, substantially no gravel will be deposited in the perforations, since the flow-blocking barriers formed in the perforations by the fluid-loss agent will prevent any substantial amount of the gravel slurry from flowing therethrough. Accordingly, the perforations, themselves, are not "gravel packed" which adversely affects the efficiency of the overall gravel pack and which is likely to lead to problems later in the production of the well.

As will be understood, after the gravel pack is in place, it is then necessary to "open" the perforations in order for the desired formation fluids, e.g. oil, to flow into the wellbore. A removal agent is then flowed down the wellbore and through the gravel. "Removal agent", as used herein, refers to a material which reacts with a particular fluid-loss agent upon contact therewith to dissolve or disintegrate the flow barrier formed by the fluid-loss agent to displace or remove it the flow barriers from the perforations. Examples of typical removal agents and the respective fluid-loss agents with which each may be used are: (a) a removal agent comprised of gelled acid such as hydrochloric acid which may be used to react with fluid-loss agents such as powdered calcium carbonate or crosslinked HEC; (b) a removal agent comprised of gelled diesel or other light hydrocarbon (e.g. produced condensate) which may be used to react with a fluid-loss agent such as benzoic acid flakes; etc. As will be understood in the well completion art, these fluid-loss agents and their respective removal agents are well known in this art.

When the removal agent is flowed into the compacted column of gravel which has previously been deposited around the screen, it does not flow evenly through the gravel. Instead, it contacts and reacts with the fluid-loss agent in the upper perforations thereby opening those perforations to flow. Once the upper perforations are opened, the removal agent takes the path of least resistance and flows into the formation through the open perforations. Accordingly, the removal agent does not readily flow through the gravel to contact the lower perforations which remain closed to flow thereby adversely affecting production from the well.

In accordance with the present invention, a well is initially completed in the same manner as above. That is, a fluid-loss material is used in conjunction with a well completion fluid to prevent loss of the completion into a formation through perforations or the like in the well casing. The fluid-loss agents may be any of the well known, commerically available fluid-loss agents some of which are named above. The fluid-loss agent forms a barrier as it flows through the perforations to prevent further flow of the well completion fluid therethrough.

Next, a screen is lowered into the wellbore on a workstring and is positioned adjacent the formation to be completed, e.g. adjacent the perforations in the well casing. As will be understood by those skilled in the art, "screen" as used herein refers to any type of structure, e.g. a screen, a prepacked screen, slotted or perforated liner, etc. which is routinely used in the gravel packing of a well. A gravel slurry is then flowed down the workstring and out of a "cross-over" or the like positioned in the workstring above the screen to deposit gravel from the slurry around the screen and thereby form the desired gravel pack.

In the present invention, however, the gravel slurry includes a removal agent as at least part of the carrier fluid in the slurry. That is, a removal agent forms or is incorporated into the carrier fluid which is mixed with the gravel to form the gravel slurry. This removal agent may be selected from known removal agents which react with the particular fluid-loss agent used in the well. For example, if either powered calcium carbonate or a crosslinked HEC is used as a fluid-loss agent, then a gelled acid such as hydrochloric acid may be used as the removal agent; if benzoic acid flakes are used as the fluid-loss agent, then gelled diesel or other light hydrocarbon may be used as the removal agent; and so on.

By incorporating the removal agent directly into the gravel slurry, the gravel, itself, acts as an excellent diverter for the removal agent during the placement of the gravel around the screen. This allows the removal agent to contact and remove the fluid-loss agent from all of the perforations, not just the upper perforations as is the case in the prior art. Further, since all of the perforations are opened as the removal agent contacts the fluid-loss agent therein, gravel slurry can flow through the respective perforation while the gravel is being placed around the screen. As the carrier fluid is lost into the formation, the gravel from the slurry is deposited in the perforations, themselves, which greatly improves the efficiency of the gravel pack being installed.

What is claimed is:

1. A method of completing a well including installing a gravel pack completion adjacent a formation in a well, said method comprising:
   flowing a fluid-loss agent into contact with said formation to form a barrier to flow into said formation wherein said fluid-loss agent is selected from the group consisting of crosslinked hydroxyethyl cellulose (HEC); calcium carbonate, and benzoic acid flakes;
   positioning a screen in said well adjacent said formation; and
   flowing a gravel slurry into said well and around said screen to deposit gravel around said screen, said gravel slurry including a removal agent which reacts with said fluid-loss agent to remove said barrier to flow into and from said formation while said gravel is being placed around said screen.

2. The method of claim I wherein said fluid-loss agent comprises:
   crosslinked hydroxyethyl cellulose (HEC); and
   said removal agent comprises:
   a gelled acid.

3. The method of claim 2 wherein said gelled acid comprises:
   a gelled, dilute hydrochloric acid.

4. The method of claim I wherein said fluid-loss agent comprises:
   calcium carbonate; and
   said removal agent comprises:
   a gelled acid.

5. The method of claim 4 wherein said gelled acid comprises:
   a gelled, dilute hydrochloric acid.

6. The method of claim I wherein said fluid-loss agent comprises:
   benzoic acid flakes; and
   said removal agent comprises:
   gelled diesel.

7. A method of installing a gravel pack completion adjacent a formation in a cased well having perforations therein adjacent said formation; said method comprising:
   flowing a fluid-loss agent through said perforations and into contact with said formation to form a barrier to flow through said perforations wherein said fluid-loss agent is selected from the group consisting of crosslinked hydroxyethyl cellulose (HEC); calcium carbonate, and benzoic acid flakes;
   positioning a screen in said well adjacent said formation; and
   flowing a gravel slurry into said well and around said screen to deposit gravel around said screen, said gravel slurry including a removal agent adapted to react with fluid-loss agent while said gravel is being deposited to thereby remove said barrier and open said perforations to flow therethrough.

8. The method of claim 7 wherein said fluid-loss agent comprises:
   crosslinked hydroxyethyl cellulose (HEC); and
   said removal agent comprises:
   a gelled acid.

9. The method of claim 8 wherein said gelled acid comprises:
   a gelled, dilute hydrochloric acid.

10. The method of claim 7 wherein said fluid-loss agent comprises:
    calcium carbonate; and
    said removal agent comprises:
    a gelled acid.

11. The method of claim 10 wherein said gelled acid comprises:
    a gelled, dilute hydrochloric acid.

12. The method of claim 7 wherein said fluid-loss agent comprises:
    benzoic acid flakes; and
    said removal agent comprises:
    gelled diesel.

* * * * *